United States Patent
Medina et al.

(10) Patent No.: US 10,155,582 B2
(45) Date of Patent: Dec. 18, 2018

(54) LOWER ATTACHMENT FOR TRIMMABLE HORIZONTAL STABILISER ACTUATOR

(71) Applicant: Goodrich Actuation Systems SAS, Buc (FR)

(72) Inventors: Raphael Medina, Écouen (FR); Quentin Ricard, Eaubonne (FR)

(73) Assignee: GOODRICH ACTUATION SYSTEMS SAS, Buc (FR)

( * ) Notice: Subject to any disclaimer, the term of this patent is extended or adjusted under 35 U.S.C. 154(b) by 182 days.

(21) Appl. No.: 15/229,408

(22) Filed: Aug. 5, 2016

(65) Prior Publication Data

US 2017/0036754 A1    Feb. 9, 2017

(30) Foreign Application Priority Data

Aug. 7, 2015  (EP) .................................... 15306278

(51) Int. Cl.
| | |
|---|---|
| *B64C 13/30* | (2006.01) |
| *B64C 13/28* | (2006.01) |
| *B64C 5/02* | (2006.01) |

(52) U.S. Cl.
CPC ............... *B64C 13/30* (2013.01); *B64C 5/02* (2013.01); *B64C 13/28* (2013.01); *Y02T 50/44* (2013.01)

(58) Field of Classification Search
CPC ............ B64C 13/30; B64C 13/28; B64C 5/02
See application file for complete search history.

(56) References Cited

FOREIGN PATENT DOCUMENTS

| | | |
|---|---|---|
| DE | 102011119946 A1 | 6/2013 |
| DE | 102011120389  * | 6/2013 |
| DE | 102011120389 A1 | 6/2013 |
| FR | 2839352 A1 | 11/2003 |

OTHER PUBLICATIONS

European Search Report for Application No. 15306278.1-1754 dated Jan. 18, 2016; 8 Pages.

* cited by examiner

*Primary Examiner* — Justin M Benedik
(74) *Attorney, Agent, or Firm* — Cantor Colburn LLP

(57) ABSTRACT

A connection for a lower attachment for a trimmable horizontal stabilizer actuator (THSA) for connecting the lower attachment to a flight control surface. The attachment includes: a surface bracket for coupling to the flight control surface, the surface bracket mounted about a gimbal of the lower attachment by a bushing disposed between the gimbal and the surface bracket; a failsafe plate fittingly engaged on a first end of the bushing; and a tightening ring mounted on a second end of the bushing opposite the first end and secured to the surface bracket by at least one contact screw, such that the contact screw is operable to urge the bushing against the failsafe plate.

8 Claims, 5 Drawing Sheets

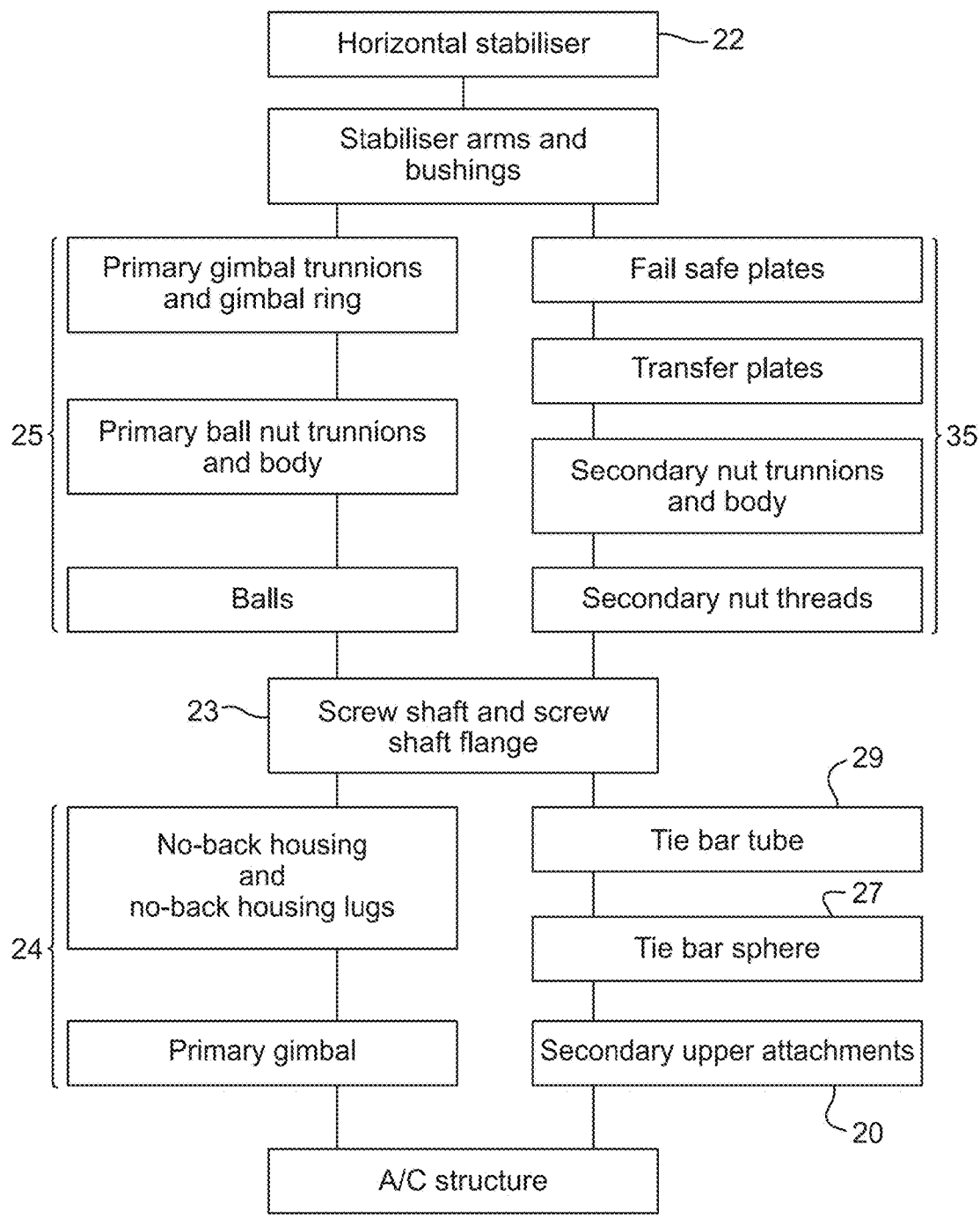

Primary load path

Secondary load path

LOWER ATTACHMENT FOR TRIMMABLE HORIZONTAL STABILISER ACTUATOR

FOREIGN PRIORITY

This application claims priority to European Patent Application No. 15306278.1 filed Aug. 7, 2015, the entire contents of which is incorporated herein by reference.

TECHNICAL FIELD

The invention relates to a lower attachment for a flight actuator such as a trimmable horizontal stabiliser actuator. In particular, it relates to adaptations to elements for use in a secondary load path of the lower attachment for an actuator that has a primary load path and a secondary load path.

BACKGROUND

It is well known for a flight actuator to include two mechanical load paths, one primary and the other secondary, with the latter intended to take up the load when the primary path has failed. In a typical prior art device, as shown in FIG. 1, when operating on the primary load path the loads are transmitted through a hollow ball or roller screw. The hollow screw houses a safety rod, also called a failsafe bar or tie bar, which is connected to the screw with a small amount of play. During normal operation of the screw, when the primary load path is working correctly, the secondary load path formed by this tie bar carries no load since there is no contact due to the small amount of play. However, in the event of a failure of the screw in the primary load path then the tie bar performs its failsafe function and ensures continuity of the transmission of loads by the actuator.

With reference to FIG. 1 a typical known flight control actuator of the trimmable horizontal stabiliser actuator (THSA) type includes a primary load path with a hollow screw 32 connected at its upper end to the aircraft via a Cardan joint system 24 joining with first aircraft structural elements S1. The primary load path further includes a nut assembly 25 mounted on the screw 32, and the nut assembly 25 is connected to the stabiliser 22 of the aircraft, this connection being achieved for example by another Cardan joint system 26.

As mentioned above, the secondary load path is provided by means of a tie bar 29 which is within the screw 32. The tie bar 29 is terminated at its upper end by a male portion, in this case taking the form of a spherical head 27, which is mounted within a female portion on a fastening piece 28, in this case taking the form of a recess 210. The fastening piece 28 is connected to the structure of the aircraft via second aircraft structural elements S2. The known system may also include some means for preventing motion of the nut assembly 25 relative to the screw 32 and/or for fixing the stabiliser 22/Cardan joint 26 in place when the primary load path fails. Thus, the lower attachment, of which the nut assembly 25 is a part, could also include secondary load path elements used when the primary load path fails.

In the example known upper attachment shown in FIG. 1 it will be understood that should the screw 32 fails then load can be carried by the secondary load path since movement of the spherical head 27 is restricted by the upper and lower shoulders of the recess 210. Consequently, the stabiliser 22 can either be safely held in a single position (in the case where the lower attachment locks in place) or in some prior art arrangements it might be permitted to continue normal movement should the tie bar 29 be connected with the screw 32 in such a way as to permit continued rotation of the screw 32 even after failure preventing it from carrying axial loads.

One possible arrangement for primary and secondary load paths in a THSA is shown in FIG. 2. A horizontal stabiliser 22 is connected by stabiliser arms and bushings to a nut assembly 25 which connects it to a screw 23. In this case the nut assembly 25 includes a gimbal assembly with primary gimbal trunnions and a gimbal ring connected to primary ball nut trunnions and a ball nut body, which is coupled via balls to the screw shaft of the screw 23. The nut assembly 25 forms the lower attachment of the actuator in the primary load path. At the upper end of the actuator a joint system such as a Cardan joint system 24 will typically include no back elements along with the primary load path gimbal, which is coupled to the aircraft structure. During normal use, without any failure, the loading for the actuator is carried via the primary path.

In the event of a failure of the primary path the loading is transferred to the secondary path. In this example at the lower attachment the horizontal stabiliser 22 is connected by the stabiliser arms and the bushings to a secondary load path lower attachment 35 comprising failsafe plates and transfer plates coupled via secondary nut trunnions and a secondary nut body to secondary nut threads which are joined to the thread of the screw 23 when the secondary load path is engaged. Typically the secondary nut threads would be arranged to lock with the threads of the screw 23 preventing movement of the horizontal stabiliser 22 when the secondary load path is engaged. From the lower attachment 35 the load in the secondary load path is transmitted via the screw 23 along the tie bar tube/rod 29 through the male end of the tie bar rod, which in this example is a tie bar sphere 27, and to the secondary load path upper attachment 20.

In this situation it will be understood that the horizontal stabiliser can be rigidly connected to the screw shaft 23 and through the tie bar tube 29 to the tie bar sphere 27 which is held by the upper attachment 20, and that therefore aerodynamic loading applied to the horizontal stabiliser during flight will result in dynamic loading on the connection between the tie bar sphere and the secondary upper attachment 20. It has been realised that this can result in undesirable "flutter" potentially causing degradation in aircraft performance and even a loss of control for the pilot.

Examples of the primary and secondary load paths are shown in FIGS. 3A and 3B. The primary load path is shown in FIG. 3A, while the secondary load path is shown in FIG. 3B wherein the detour taken by the secondary load path through the lower attachment is evident.

Typically, the lower attachment includes a sheet plate which, when the primary load path is functioning normally, keeps the secondary load path unloaded. It achieves this by maintaining a clearance between the failsafe plates and the stabiliser arms and bushings. In the event of failure of the primary load path, the sheet plate breaks and allows loading of the secondary load path. Particularly, the breaking of the sheet plate results in the clearance between the failsafe plate and the bushings closing, and the failsafe plate then transfers load to the bushings and stabiliser arms. Therefore, the sheet plate is a complicated component.

Further, THSAs are typically fitted with a detection device to detect failure of the primary load path and loading of the secondary load path. The sheet plate must not interfere with the operation of the detection device.

Consequently, the manufacture of a sheet plate can be expensive, and it can be time-consuming to install correctly in the lower attachment.

A consequence of the existence of clearance between the failsafe plate and bushings is that there is play between the components. This can result in 'flutter' of the flight surface or backlash.

SUMMARY

According to a first aspect of the invention, there is provided a lower attachment system for a THSA. The system comprises a floating bushing which mounts a gimbal of the lower attachment and spherical bearings to arms of the stabiliser (or surface bracket). A flange portion of the bushing contacts a failsafe plate to hold the failsafe plate securely in relation to the bushing. A tightening ring is fixedly secured to the bushing, and contact screws secure the tightening ring to the surface bracket. The contact screws also define and control a clearance between the tightening ring and surface bracket.

By tightening the contact screws, the tightening ring can be urged towards the surface bracket, in turn urging the bushing against the failsafe plate. The failsafe plate is thereby held firmly in relation to the bushing, and there is therefore no need for there to be clearance between the bushing and the failsafe plate. Further, flutter can be avoided during loading of the secondary load path.

The bushing may include an insert portion configured to securely engage with the failsafe plate. This can improve the coupling between the failsafe plate and the bushing. The insert portion can have a substantially circular shape, and the failsafe plate can have a substantially circular aperture that couplingly engages the insert portion of the bushing.

The tightening ring may be fixed rotationally relative to the bushing. The connection may comprise a plurality of contact screws, and may preferably comprise three contact screws.

The arms may connect a flight control surface to the lower attachment. The gimbal may also form part of the lower attachment of the THSA.

The system may comprise a second failsafe plate disposed on the opposite side of the attachment to the failsafe plate described above. The system may further comprise stiffness bars disposed between the first and second failsafe plates of the two connections. The stiffness bars may maintain separation of the failsafe plates and help ensure good contact between the failsafe plates and the respective bushings.

The system may comprise a trunnion and preferably may also comprise a transfer plate. During failure of the primary load path, the secondary load path may be transferred through the trunnion, and further through the transfer plate. The transfer plate may be fixed to the failsafe plate so as to transfer loads to the failsafe plate. The trunnion and transfer plate are preferably unloaded when the primary load path is loaded and are therefore only loaded during failure of the primary load path.

According to another aspect of the invention there is provided a THSA comprising a lower attachment system according to the above description. An aircraft may comprise a THSA according to the invention.

BRIEF DESCRIPTION OF THE DRAWINGS

An exemplary embodiment of the present invention will now be described by way of example only and with reference to the accompanying drawings in which:

FIG. 2 illustrates a typical arrangement for primary and secondary load paths in a typical horizontal stabiliser actuator (THSA);

DETAILED DESCRIPTION

Figure 4:
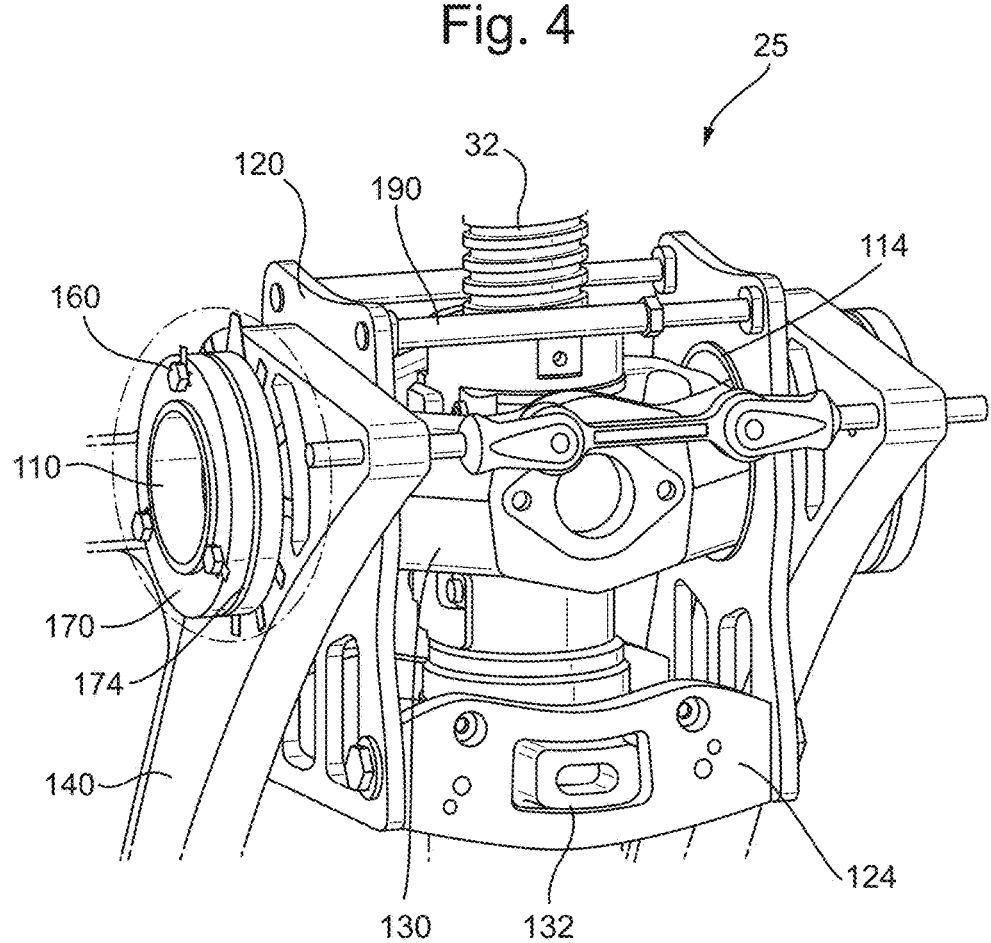
FIG. 4 is a perspective view of a lower attachment system for a THSA in accordance with a preferred embodiment of the present invention.

FIG. 4 shows a perspective view of a lower attachment system for a THSA. The THSA drives the flight surface 22 using the ballnut assembly 25 (see FIG. 1). In the event of a failure of the primary load path, the ballnut 25 locks to the screwshaft 32.

Figure 5:
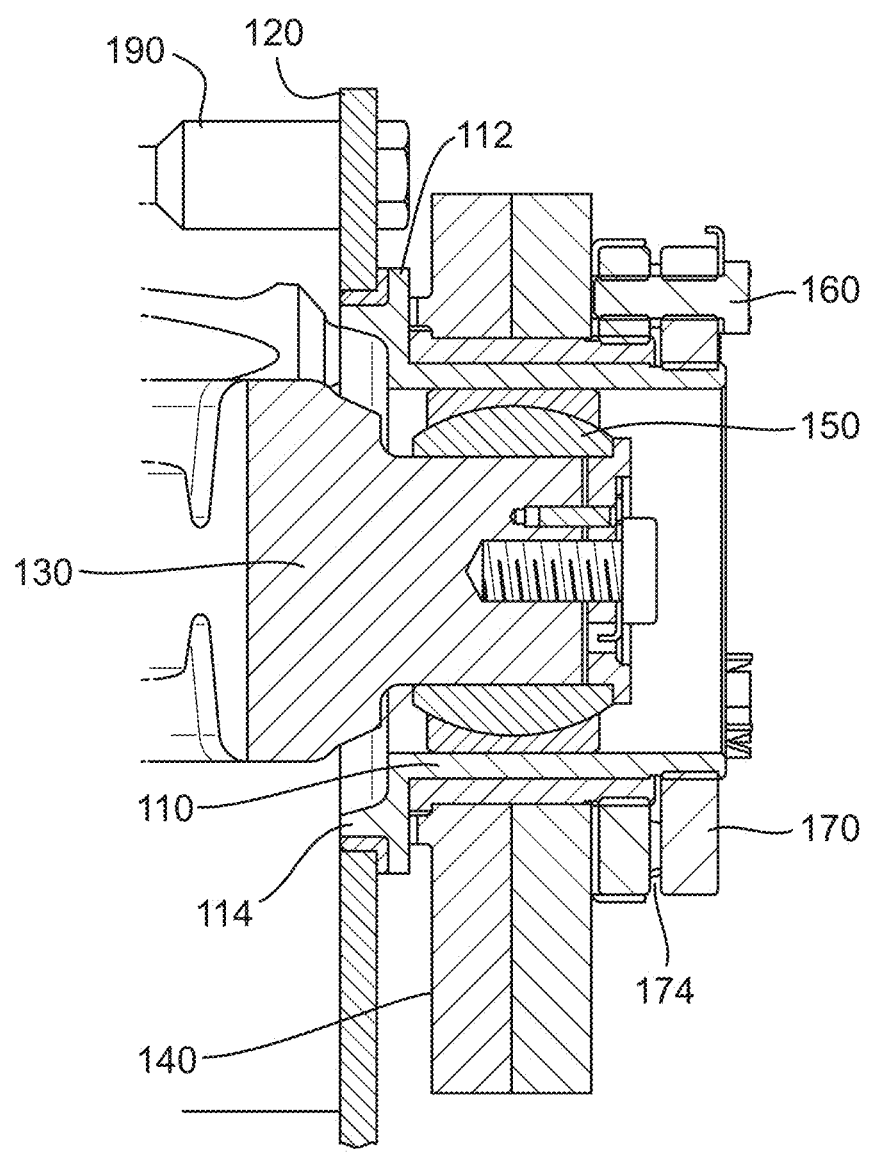
FIG. 5 is a cross-section of the lower attachment system of FIG. 4.

FIG. 5 shows a cross-section of the connection of the lower attachment system. The connection of the lower attachment comprises a bushing 110, a failsafe plate 120, a surface bracket 140, a spherical bearing 150, contact screws 160 and a tightening ring 170. Gimbal 130 forms part of the ballnut 25 of the lower attachment.

Figure 1:
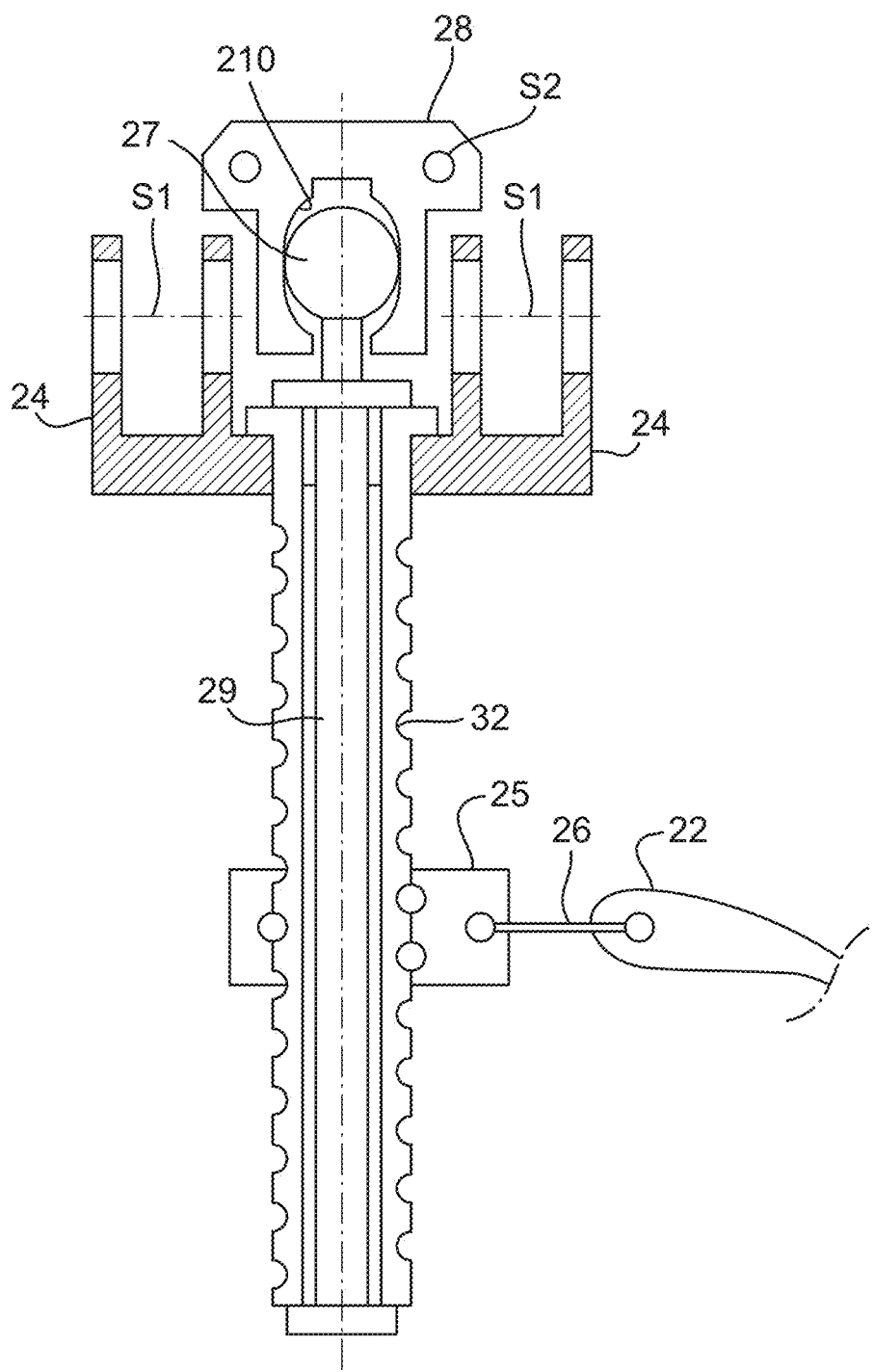
FIG. 1 illustrates a prior art flight actuator.
Figure 3A:
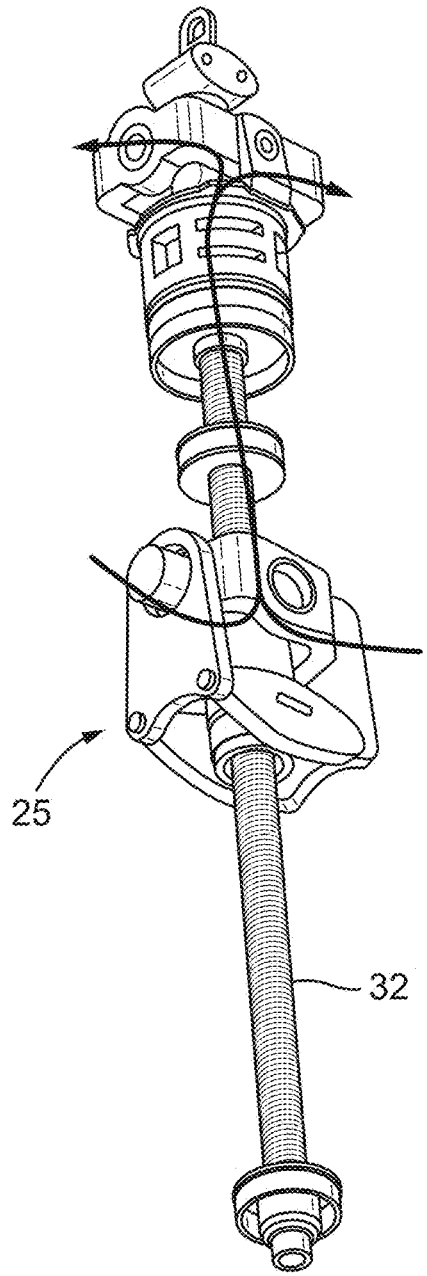
FIG. 3A illustrates the primary load path through a THSA.
Figure 3B:
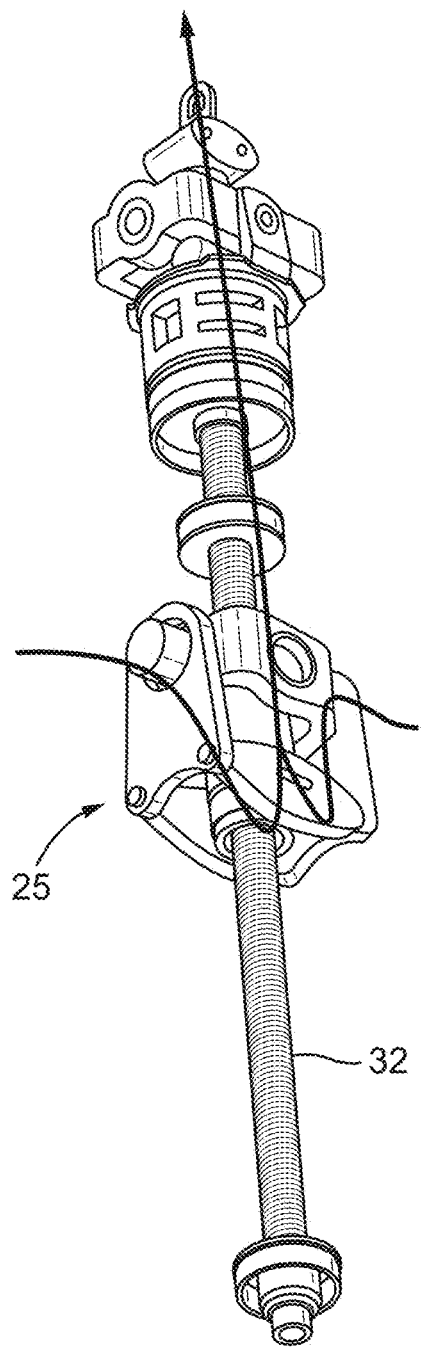
FIG. 3B illustrates the secondary load path through a THSA.

As shown in FIG. 5, the bushing 110 fits within an aperture of the surface bracket 140, and surrounds the spherical bearing 150 to fasten the gimbal 130 of the actuator to the bracket 140. In use of the THSA, the gimbal 130 may be raised or lowered as the ballnut 25 of the lower attachment is raised or lowered relative to the screwshaft 32 of the THSA. The connection of FIG. 5 therefore allows the position of the surface bracket 140, and hence the flight control surface 22 to which the surface bracket is connected, to be controlled by the THSA. That is, as the ballnut 25 of the lower attachment moves, the connection allows the bracket 140 to pivot relative to the gimbal 130. In FIG. 1, the surface bracket 140 is shown as Cardan joint system 26.

The bushing 110 includes a flange portion 112 which contacts the failsafe plate 120 and bears on the failsafe plate to act as a bearing portion, and an insert portion 114 onto which the failsafe plate 120 fits. The failsafe plate 120 may mount to insert portion 114 of the bushing 110 so that there is negligible clearance between the bushing 110 and the failsafe plate 120. The failsafe plate 120 may have a substantially circular aperture to receive the insert portion 114 of the bushing 110, and the insert portion 114 of the bushing 110 may have a substantially circular cross-section to match the aperture of the failsafe plate 120. Therefore, the failsafe plate 120 and the bushing 110 may couplingly engage. The engagement may be fitted so that in use the failsafe plate 120 does not translate position significantly relative to the bushing 110. The aperture in the failsafe plate 120 and the insert portion 114 of the bushing 110 may take any other suitable shape, though they are preferably substantially circular.

A tightening ring 170 is mounted about the end of the bushing 110 opposite to the end of the bushing 110 which is in contact with the failsafe plate 120. In FIG. 5, the ring 170 is substantially annular and extends in a plane radially outwardly from the axis defined by the bushing 110. The ring 170 need not be an annulus, and may instead be square, or rectangular, or triangular, or any other shape with an aperture suitable for mounting on the bushing 110. The tightening ring 170 is fixedly mounted on the bushing 110 so that during use it does not move axially relative to the bushing 110. For example, the bushing 110 may have a portion which is narrower at the point where the tightening ring 170 is mounted than elsewhere along its length.

Contact screws 160 fasten the tightening ring 170 to the surface bracket 140. The contact screws 160 thereby define a clearance 174 between the tightening ring 170 and the surface bracket 140, and the clearance 174 is bridged by the screws 160. By tightening the contact screws 160, the tightening ring 170 is urged towards the surface bracket 140. Since the tightening ring 170 is fixed to the bushing 110, the bushing 110 is urged in the same direction as the tightening ring 170. The flange portion 112 of the bushing 110 is therefore urged against the failsafe plate 120.

Three screws 160 are shown in FIG. 5, but there may be any suitable number. Preferably, there is a plurality of contract screws. Preferably the tightening ring 170 is fixed rotationally relative to the bushing 110. Therefore, by having a plurality of contact screws 160, the bushing may be prevented from rotation relative to the bracket 140.

Flange portion 112 of the bushing 110 thus bears against the failsafe plate 120 and insert portion 114 is held securely within the aperture of the failsafe plate 120. The failsafe plate is therefore held relative to the bushing 110 and the gimbal 130. Therefore, there is no need for there to be clearance between the failsafe plate 120 and the bushing 110, as is needed in the prior art when a sheet plate is used.

In the event of failure of the primary load path, a trunnion 132 on the actuator bears down on a transfer plate 124. The transfer plate 124 is fixed to the failsafe plate 120, and may be fixed rigidly so that loads are transferred through the transfer plate 124 to the failsafe plate 120. Therefore, loads are transferred through the secondary load path, as shown in FIG. 1. Since there is no clearance between the failsafe plate 120 and the bushings 110, backlash is avoided in the event of a failure of the primary load path and a transfer of the load through the secondary load path.

Stiffness rods 190 can be included as part of the lower attachment, positioned between the failsafe plate 120 and a second failsafe plate 122 on the opposite side of the lower attachment of the actuator. The stiffness rods 190 may separate the failsafe plates 120 and 122 and maintain firm contact between failsafe plates 120 and 122 and the flange portions 112 of bushings 110, by preventing them from moving away from the bushing 110. By controlling the position of the contact screws 160, the force holding the bushing against the failsafe plate can be controlled.

Further, since no complicated sheet plate is required, a reduction in weight can be achieved. This reduction can be about 1 kg. The removal of the requirement for a sheet plate may also reduce the cost of the THSA.

The systems described herein and shown in the drawings provide a lower attachment system for a trimmable horizontal stabiliser actuator that improves reliability of operation and the cancellation of backlash. While the apparatus herein has been shown and described with reference to exemplary embodiments, those skilled in the art will appreciate that changes and/or modifications may be made thereto without departing from the scope of the present invention as defined by the appended claims.

The invention claimed is:

1. A connection for a lower attachment for a trimmable horizontal stabiliser actuator (THSA) for connecting the lower attachment to a flight control surface; comprising:
    a surface bracket (140) for coupling to the flight control surface, the surface bracket mounted about a gimbal (130) of the lower attachment by a bushing (110) disposed between the gimbal and the surface bracket;
    a failsafe plate (120) fittingly engaged on a first end of the bushing; and
    a tightening ring (170) mounted on a second end of the bushing opposite the first end and secured to the surface bracket by at least one contact screw (160), such that the contact screw is operable to urge the bushing against the failsafe plate.

2. The connection of claim 1, wherein the failsafe plate comprises an aperture; wherein the first end of the bushing comprises an insert portion (114) disposed within the aperture; and wherein the bushing comprises a bearing portion (112) disposed adjacent the failsafe plate (120) so as to bear against the failsafe plate.

3. The connection of claim 1, further comprising:
    a spherical bearing (150) disposed between the gimbal (130) and the surface bracket (140) to allow articulation therebetween.

4. The connection of claim 1, wherein the contact screw bridges a clearance (174) between the tightening ring (170) and the surface bracket (140), so that the clearance may be controlled by tightening or loosening the contact screw (160).

5. The connection of claim 1, further comprising:
    stiffness rods (190) disposed on the opposite side of the failsafe plate (120) to the bushing (110).

6. The connection of claim 1, further comprising:
    a trunnion (132) configured to transfer load from a ballnut of the lower attachment to the failsafe plate (120) in the event of a failure of the primary load path of the THSA.

7. A lower attachment for a trimmable horizontal stabiliser actuator, comprising the connection of claim 1.

8. A trimmable horizontal stabiliser actuator comprising the connection of claim 1.

* * * * *